US012731864B2

(12) United States Patent
Kim et al.

(10) Patent No.: US 12,731,864 B2
(45) Date of Patent: Sep. 8, 2026

(54) LITHIUM BATTERY AND MANUFACTURING METHOD THEREFOR

(71) Applicant: SAMSUNG SDI CO., LTD., Yongin-si (KR)

(72) Inventors: Jinwoo Kim, Yongin-si (KR); Hyunwook Jung, Yongin-si (KR); Suna Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 286 days.

(21) Appl. No.: 18/013,579

(22) PCT Filed: May 16, 2022

(86) PCT No.: PCT/KR2022/006990

§ 371 (c)(1),
(2) Date: Jun. 22, 2023

(87) PCT Pub. No.: WO2022/245082

PCT Pub. Date: Nov. 24, 2022

(65) Prior Publication Data

US 2024/0266674 A1 Aug. 8, 2024

(30) Foreign Application Priority Data

May 17, 2021 (KR) ........................ 10-2021-0063615

(51) Int. Cl.

*H01M 50/46* (2021.01)
*H01M 10/052* (2010.01)
*H01M 50/426* (2021.01)
*H01M 50/434* (2021.01)
*H01M 50/491* (2021.01)

(52) U.S. Cl.

CPC ....... *H01M 50/461* (2021.01); *H01M 10/052* (2013.01); *H01M 50/426* (2021.01); *H01M 50/434* (2021.01); *H01M 50/491* (2021.01)

(58) Field of Classification Search

None

See application file for complete search history.

(56) References Cited

U.S. PATENT DOCUMENTS

| | | | |
|---|---|---|---|
| 10,707,467 B2 | 7/2020 | Kim et al. | |
| 2016/0294003 A1* | 10/2016 | Yamamoto ........... | C01G 17/006 |
| 2017/0338460 A1 | 11/2017 | Kim et al. | |
| 2018/0123106 A1 | 5/2018 | Shin et al. | |
| 2018/0309108 A1 | 10/2018 | Shin et al. | |
| 2019/0013504 A1 | 1/2019 | Choi et al. | |
| 2020/0075910 A1 | 3/2020 | Kim et al. | |
| 2020/0127264 A1 | 4/2020 | Kim et al. | |
| 2020/0407543 A1 | 12/2020 | Amin-Sanayei et al. | |
| 2021/0218109 A1 | 7/2021 | Kim et al. | |

FOREIGN PATENT DOCUMENTS

| | | |
|---|---|---|
| CN | 107394090 A | 11/2017 |
| CN | 108260363 A | 7/2018 |
| CN | 108463904 A | 8/2018 |
| CN | 110875452 A | 3/2020 |
| CN | 112400254 A | 2/2021 |
| JP | 2019-029314 A | 2/2019 |
| KR | 10-2015-0034944 A | 4/2015 |
| KR | 10-2017-0113474 A | 10/2017 |
| KR | 10-2019-0004158 A | 1/2019 |
| KR | 10-2019-0128136 A | 11/2019 |
| KR | 10-2020-0026595 A | 3/2020 |
| KR | 10-2020-0036641 A | 4/2020 |
| WO | WO 2020/142702 A1 | 7/2020 |

OTHER PUBLICATIONS

Machine translation of KR 10-2015-0034944A, published on Apr. 6, 2015 (Year: 2015).*
International Search Report dated Aug. 26, 2022, of PCT Patent Application No. PCT/KR2022/006990.
European Search Report dated Oct. 14, 2024, of the corresponding EP Patent Application No. 22804937.5.
Chinese Office action dated Jun. 11, 2026.

* cited by examiner

*Primary Examiner* — Anca Eoff
(74) *Attorney, Agent, or Firm* — Lee IP Law, P.C.

(57) ABSTRACT

Provided are a lithium battery and a manufacturing method therefor, the lithium battery comprising: a cathode; an anode; and a separator interposed between the cathode and the anode and including a porous substrate and an adhesive layer, wherein the adhesive layer of the separator contains ceramic particles and a binder at a mixing weight ratio of 4:6 to 6:4, the binder is a polyvinylidene fluoride-based compound, the binder includes a first binder and a second binder, and the adhesion ratio of the lithium battery, which is represented by equation 1 below, is 0.05 to 1.0.

$$\text{adhesion ratio} = \{(\text{dry adhesion} - 10)/(\text{wet adhesion} - 350)\} \quad \text{<Equation 1>}$$

In equation 1, dry adhesion and wet adhesion are as defined in the detailed description.

8 Claims, 2 Drawing Sheets

LITHIUM BATTERY AND MANUFACTURING METHOD THEREFOR

CROSS REFERENCE TO RELATED APPLICATIONS

This is the U.S. national phase of PCT/KR2022/006990 filed May 16, 2022, which is based on Korean Patent Application No. 10-2021-0063615 filed on May 17, 2021, the entire contents of all of which are hereby incorporated by reference.

TECHNICAL FIELD

The present invention relates to a lithium battery and a manufacturing method therefor.

BACKGROUND ART

In order to meet the trend toward compact, high-performance devices, it is becoming important to manufacture lithium batteries that are small and lightweight and have high energy density. In addition, the stability of lithium batteries under high-capacity, high-temperature and high-voltage conditions has become an important factor for applications in electric vehicles and the like. To meet the requirement to be suitable for the purposes described above, there is demand for lithium batteries having a high discharge capacity per unit volume, high energy density and excellent lifetime characteristics.

A separator is disposed between a cathode and an anode to prevent a short circuit therebetween in a lithium battery. An electrode assembly including a cathode, an anode, and a separator disposed between the cathode and the anode is wound to have a jelly roll shape, and the jelly roll is rolled to improve adhesion between the cathode/anode and the separator in the electrode assembly.

In order to manufacture a lithium battery having excellent safety, there is a need for a separator having excellent adhesion and heat resistance.

DESCRIPTION OF EMBODIMENTS

Technical Problem

One aspect is to provide a lithium battery having improved adhesion and heat resistance and enhanced lifetime characteristics.

Another aspect is to provide a method for manufacturing the lithium battery.

Solution to Problem

According to one aspect, provided is a lithium battery comprising: a cathode; an anode; and a separator interposed between the cathode and the anode and including a porous substrate and an adhesive layer, wherein the adhesive layer of the separator contains ceramic particles and a binder at a mixing weight ratio of 4:6 to 6:4, the binder being a polyvinylidene fluoride-based compound, the binder including a first binder and a second binder, and wherein the adhesion ratio of the lithium battery, which is represented by equation 1 below, is 0.05 to 1.0.

$$\text{adhesion ratio} = \{(\text{dry adhesion} - 10)/(\text{wet adhesion} - 350)\}$$ <Equation 1>

In equation 1, wet adhesion represents electrode adhesion (bending strength) of a separator, measured by using a 3-point bending method in a lithium battery obtained by impregnating a battery assembly including a cathode, an anode, and a separator with an electrolyte, and then pressing the same under conditions of 10 to 20 kgf/cm$^2$, 70 to 90° C. in temperature, and 1 to 5 minutes in time, and dry adhesion represents electrode adhesion (bending strength) of a separator, measured by using a 3-point bending method in a lithium battery obtained by impregnating a battery assembly including a cathode, an anode, and a separator with an electrolyte, and then pressing the same under conditions of 10 to 20 kgf/cm$^2$ in pressure, 70 to 90° C. in temperature, and 5 to 20 seconds in time.

According to another aspect, provided is a method for manufacturing a lithium battery, the method comprising the steps of:

preparing a laminate by laminating a cathode; a porous substrate and a separator disposed on one surface of the porous substrate; and an anode; and pressing the laminate under conditions of a pressure of 10 to 20 kgf/cm$^2$ in pressure, 70 to 90° C. in temperature, and 1 to 5 minutes in time.

Advantageous Effects of Disclosure

According to one aspect, by controlling the composition of an adhesive layer constituting the separator, and when manufacturing a battery assembly, the press conditions, a lithium battery having excellent adhesion between an electrode having optimized dry adhesion and wet adhesion and a separator and improved lifetime characteristics, can be manufactured.

DESCRIPTION OF SYMBOLS

Figure 1:
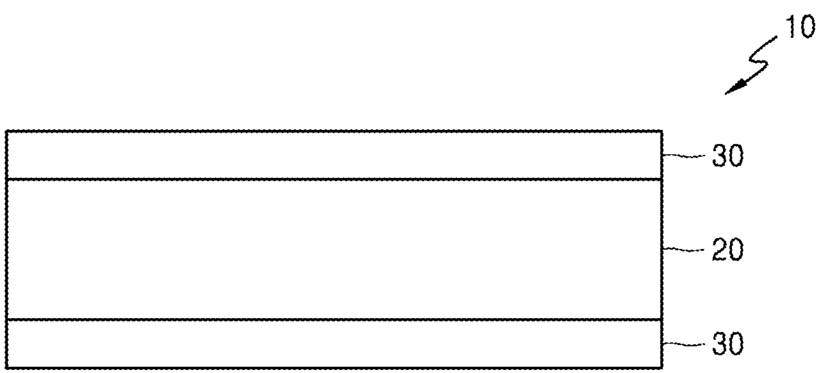
FIG. 1 is a schematic diagram showing a cross section of a separator of a lithium battery according to an embodiment.

10: Separator 20: Porous substrate
30: Adhesive layer 40: Cathode
50: Anode 60: Electrode assembly
70: Case

BEST MODE

Hereinafter, a lithium battery and a manufacturing method therefor according to exemplary embodiments will be described in more detail.

Recently, as a separator used in small or medium-large-sized lithium batteries, a separator excellent in both of wet adhesion that holds a cell shape and dry adhesion for cell assembly processability is required.

However, until now, there is no known method for evaluating both wet adhesion and dry adhesion of a separator with respect to an electrode, and a separator that is excellent in both wet adhesion and dry adhesion has not yet been developed.

Accordingly, in order to solve the above-mentioned problems, by controlling the composition of the separator and press conditions of the separator and the electrode, the inventors of the present invention have completed the invention of a lithium battery having excellent both wet adhesion and dry adhesion. In addition, provided is a method for evaluating wet adhesion and dry adhesion between a separator and an electrode in a lithium battery by cell strength measurement using 3-point bending.

Adhesion between an electrode and a separator is commonly evaluated by a peel test. However, according to the peel test, it is difficult to evaluate wet adhesion, and since the flatness of press equipment is affected when evaluating each sheet one by one, the adhesion variation is severe and reliability is deteriorated.

However, a jelly-roll type battery laminate by laminating several sheets of electrodes and separators are manufactured, and in the lithium battery according to one embodiment, the adhesion may be evaluated by using cell strength of the battery laminate using 3-point bending.

In the present specification, the adhesion ratio of the separator constituting the lithium battery to the electrode is represented by equation 1 below.

$$\text{adhesion ratio} = \{(\text{dry adhesion} - 10)/(\text{wet adhesion} - 350)\}$$ <Equation 1>

In equation 1, the wet adhesion is obtained by measuring the adhesion between the electrode and the separator by impregnating a battery assembly including a cathode, an anode, and a separator with an electrolyte, and then pressing the same at a specific temperature and pressure to adhere the electrode to the separator. The wet adhesion is related to the property of holding a cell shape. In addition, the dry adhesion is evaluated by using the adhesion of the electrode and the separator after pressing a battery assembly, including a cathode, an anode, and a separator, at a specific temperature and pressure to adhere the electrode and the separator, and is related to cell assembly processability. The adhesion (bending strength) of the separator with respect to the electrode is determined by measuring the adhesion between the active material layer of the cathode and the separator by using a 3-point bending (INSTRON) method.

According to one embodiment, a lithium battery that has undergone a 0.1 C charge/discharge step is pressed at a speed of 5 mm/min using a jig to measure a MAX value (N, MPa) from zero-point to 5 mm bending.

A lithium battery according to an embodiment may include a cathode; an anode; and a separator interposed between the cathode and the anode and including a porous substrate and an adhesive layer, wherein the adhesive layer of the separator contains ceramic particles and a binder at a mixing weight ratio of 4:6 to 6:4, the binder being a polyvinylidene fluoride-based compound, the binder including a first binder and a second binder, and wherein the adhesion ratio of the lithium battery, which is represented by equation 1 below, is 0.05 to 1.0.

$$\text{adhesion ratio} = \{(\text{dry adhesion} - 10)/(\text{wet adhesion} - 350)\}$$ <Equation 1>

In equation 1, wet adhesion represents electrode adhesion (bending strength) of a separator, measured by using a 3-point bending method in a lithium battery obtained by impregnating a battery assembly including a cathode, an anode, and a separator with an electrolyte, and then pressing the same under conditions of 10 to 20 kgf/cm$^2$, 70 to 90° C. in temperature, and 1 to 5 minutes in time.

In (dryadhesion−10) of equation 1, 10 is derived from the minimum strength of jelly roll (J/R) required in cell-assembling, and in (wetadhesion−350), 350 is derived from the minimum cell strength for ensuring reliability.

In the present specification, the electrolyte includes a lithium salt and an organic solvent.

The organic solvent may be, for example, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, methyl propionate, ethyl propionate, propyl propionate, benzonitrile, acetonitrile, tetrahydrofuran, 2-methyltetrahydrofuran, γ-butyrolactone, dioxolane, 4-methyldioxolane, N, N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether, or a mixture thereof. In addition, the lithium salt is, for example, $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (However, x and y are natural numbers), LiCl, LiI, or a mixture thereof. The electrolyte is, for example, 1.3 M $LiPF_6$ dissolved in a 3/5/2 (volume ratio) mixed solvent of ethylene carbonate (EC)/ethyl methyl carbonate (EMC)/diethyl carbonate (DEC).

Dry adhesion represents electrode adhesion (bending strength) of a separator, measured by using a 3-point bending method in a lithium battery obtained by pressing a battery assembly including a cathode, an anode, and a separator under conditions of 10 to 20 kgf/cm$^2$, 70 to 90° C. in temperature, and 5 to 20 minutes in time.

The aforementioned adhesion ratio is, for example, 0.05 to 1.00, 0.07 to 0.98, 0.09 to 0.96, 0.1 to 0.95, 0.2 to 0.85, or 0.3 to 0.85.

The wet adhesion is 350 N or more, for example, 350 to 500 N, and the dry adhesion is 10 N or more, for example, 10 to 50 N.

When the mixing weight ratio of the ceramic particles and the binder is within the range stated above, a lithium battery having excellent adhesion between the electrode and the separator may be manufactured. Here, the binder is a total of the first binder and the second binder.

With respect to a total weight of the first binder and the second binder, the first binder is included in an amount of 10 to 50 wt % and the second binder is included in an amount of 50 to 90 wt %.

Referring to FIG. 1, a separator 10 for a lithium battery according to an embodiment includes a porous substrate 20 and an adhesive layer 30 positioned on one or both surfaces of the porous substrate 20.

In the adhesive layer 30 of the separator, the ceramic particles are one or more selected from alumina ($Al_2O_3$), boehmite, $BaSO_4$, MgO, $Mg(OH)_2$, clay, silica ($SiO_2$), $TiO_2$, ZnO, CaO, $SiO_2$, $TiO_2$, $SnO_2$, $CeO_2$, NiO, GaO, $ZrO_2$, $Y_2O_3$, $SrTiO_3$, and $BaTiO_3$. In addition, the average size of the ceramic particles is 1 μm to 20 μm, 2 to 15 μm, or 3 to 12 μm.

In the present specification, the average size indicates an average particle diameter when the ceramic particles are spherical, and indicates a major axis length when the ceramic particles are non-spherical.

The average particle diameter means D50 by volume. The average particle diameter is measured using, for example, a measuring device of a laser diffraction method or a dynamic light scattering method. The average particle size is measured by using, for example, a laser scattering particle size distribution system (for example, LA-920 manufactured by HORIBA), and is a median particle size (D50) at a cumulative volume of 50% counted from the side of a particle with a smaller particle size by volume conversion.

In the separator, the binder serves to fix the ceramic particles on the porous substrate and at the same time provides adhesion so that one side of the adhesive layer is well attached to the porous substrate and the other side is well attached to the electrode. The average particle diameter of the binder is 100 to 300 nm. When the binder has the composition and average particle diameter stated above, the adhesion of the adhesive layer with respect to the porous substrate is excellent. Even when the separator is exposed to high temperatures, the binder has high heat resistance, and thus can maintain a matrix form of a network structure.

The glass transition temperature (Tg) value of a polyvinylidene fluoride-based compound used as the first binder and the second binder is 50° C. or higher, and the weight average molecular weight of the polyvinylidene fluoride-based compound is 200,000 to 3,000,000 g/mol, 200,000 to 2,000,000 g/mol, or 300,000 to 1,500,000 g/mol. When the weight average molecular weight of the polyvinylidene fluoride-based compound is within the range stated above, the separator may have excellent adhesion.

The polyvinylidene fluoride-based compounds is, for example, polyvinylidene fluoride, a vinylidene fluoride-hexafluoropropylene copolymer, a vinylidene fluoride-trichloroethylene copolymer, a vinylidene fluoride-chlorotrifluoroethylene copolymer, a vinylidene fluoride-hexafluoropropylene-acrylic acid copolymer, or a combination thereof.

The first binder is a vinylidenefluoride-hexafluoropropylene copolymer. The first binder may include a vinylidene fluoride repeating unit and a hexafluoropropylene repeating unit.

The first binder may further include a repeating unit derived from a monomer having at least one hydroxyl group. When these repeating units are further included, the first binder has improved adhesion, durability and air permeability.

The monomer having at least one hydroxyl group is one or more selected from the group consisting of (meth)acrylic acid, a derivative of (meth)acrylate having a hydroxyl group, itaconic acid or a derivative thereof, maleic acid or a derivative thereof, and hydroxyalkane allyl ether.

The content of the repeating unit derived from the monomer having at least one hydroxyl group is 0.5 to 10 wt % or 0.5 to 7 wt %.

According to one embodiment, the first binder may include 80 to 99 wt % of the vinylidene fluoride repeating unit, 0.5 to 10 wt % of the hexafluoropropylene repeating unit, and 0.5 to 10 wt % of the repeating unit derived from the monomer having at least one hydroxyl group.

The first binder may have various forms, such as an alternating polymer in which the repeating units are alternately distributed, a random polymer in which the repeating units are randomly distributed, or a graft polymer in which some repeating units are grafted. In addition, the first binder may be a linear polymer, a branched polymer, or a mixture thereof.

The vinylidene fluoride repeating unit may be included in an amount of 90 wt % to 99.5 wt %, 93 wt % to 99 wt %, or 95 wt % to 99 wt %, with respect to the first binder. When the vinylidene fluoride repeating unit is included in the range stated above, the first binder can secure excellent adhesion and electrolyte impregnability.

The hexafluoropropylene repeating unit is included, with respect to the first binder, in an amount of greater than 0 wt % and less than or equal to 10 wt %, and may be included, within the above range, in an amount of 0.5 wt % to 10 wt %, 1 wt % to 10 wt %, 1 wt % to 9 wt %, 2 wt % to 7 wt %, or 4 wt % to 6 wt %. When the hexafluoropropylene repeating unit is included in the range stated above, the first binder can secure chemical stability and exhibit excellent adhesiveness while exhibiting excellent solubility in a low boiling point solvent. Accordingly, it is possible to form an adhesive layer using a low boiling point solvent without a separate additional process, and by using a high boiling point solvent, it is possible to prevent a decrease in air permeability that may inevitably occur.

The low boiling point solvent may be, for example, a solvent having a boiling point of about 80° C. or less, and may be, for example, acetone, methyl ethyl ketone, ethyl isobutyl ketone, tetrahydrofuran, dimethylformaldehyde, cyclohexane, or a mixture thereof. However, it is not limited thereto. For example, with respect to a solvent having a boiling point of 80° C. or less, the first binder may have solubility of about 20 or less at 40° C.

The weight average molecular weight of the first binder may be 800,000 to 1,500,000, 800,000 to 1,300,000, or 900,000 to 1,200,000. When the first binder has a weight average molecular weight within the above range, excellent adhesion may be exhibited. The weight average molecular weight may be a polystyrene equivalent average molecular weight measured by using gel permeation chromatography.

The crystallinity of the first binder may be 35% to 45%, for example, 38% to 45%, or 40% to 45%. In this case, the first binder may exhibit excellent adhesion. The crystallinity of the first binder may be higher than that of the second binder, which will be described later.

The first binder may be prepared by various known methods, such as emulsion polymerization, suspension polymerization, massive polymerization, solution polymerization, or bulk polymerization. For example, the first binder may be prepared by suspension polymerization.

The second binder may include a vinylidene fluoride repeating unit and a hexafluoropropylene repeating unit. The second binder may have various forms such as alternating polymers, random polymers, or graft polymers. The second binder may be a linear polymer, a branched polymer, or a mixture thereof, and may be a polymer having more branched chains than the first binder.

The vinylidene fluoride repeating unit of the second binder may be included in an amount of 90 wt % to 99.5 wt %, 93 wt % to 99 wt %, or 95 wt % to 99 wt %. When the vinylidene fluoride repeating unit is included in the range stated above, the second binder can secure excellent adhesion and electrolyte impregnability.

The hexafluoropropylene repeating unit of the second binder is included in an amount of greater than 0 wt % and less than or equal to 10 wt %, and within the above range, may be included in an amount of 0.5 wt % to 10 wt %, 1 wt % to 9 wt %, 2 wt % to 8 wt %, 3 wt % to 7 wt %, or 4 wt % to 6 wt %. When the hexafluoropropylene repeating unit is included in the range stated above, the second binder can secure chemical stability and exhibit excellent adhesiveness while exhibiting excellent solubility in a low boiling point solvent. Accordingly, the adhesive layer 30 may be formed using a low boiling point solvent without a separate additional process, and a decrease in air permeability that can inevitably occur when a high boiling point solvent is used can be prevented.

The average molecular weight of the second binder may be 600,000 or less, 550,000 or less, 500,000 or less, for example 500 to 500,000, 1,000 to 500,000, 10,000 to 500,000, 100,000, 200,000 to 500,000, 300,000 to 500,000, or 3500,000 to 500,000. When the second binder has a weight average molecular weight within the above range, the adhesive layer 30 including the second binder may exhibit excellent wet adhesion and dry adhesion. The weight average molecular weight may be a polystyrene equivalent average molecular weight measured by using gel permeation chromatography.

The crystallinity of the second binder is 35% to 45%, for example, 35% to 40%, or 35% to 37%. When the second binder has a degree of crystallinity within the above range, the adhesive layer 30 including the same exhibits excellent dry adhesion. The crystallinity of the second binder may be lower than that of the first binder.

The second binder may be prepared by various known methods such as emulsion polymerization, suspension polymerization, bulk polymerization, solution polymerization, or bulk polymerization, and may be prepared by, for example, emulsion polymerization.

The separator 10 may exhibit excellent heat resistance, stability, wet adhesion and dry adhesion by including the adhesive layer 30 containing the ceramic particles and the binder.

In the adhesive layer, the content of the ceramic particles is 40 to 60 parts by weight and the content of the binder is 40 to 60 parts by weight based on 100 parts by weight of a total weight of the adhesive layer. When the content of the ceramic particles and the binder in the adhesive layer is within the above range, heat resistance of the adhesive layer is improved, and rapid contraction or deformation of the separator due to temperature rise can be prevented.

The adhesive layer has a thickness of 0.01 μm to 20 μm, 1 μm to 10 μm, or 1 μm to 5 μm. When the thickness of the adhesion is within the above range, excellent adhesion is exhibited.

The porous substrate included in the separator may be a polyolefin-based substrate containing polyolefin, and the polyolefin-based substrate has an excellent shutdown function and can contribute to improving battery safety. The polyolefin-based substrate may be selected from, for example, a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include non-olefin resin in addition to olefin resin, or may include a copolymer of olefin and a non-olefin monomer.

The thickness of the porous substrate is 1 μm to 100 μm, 1 μm to 40 μm, 1 μm to 30 μm, 5 μm to 20 μm, 5 μm to 15 μm, or 5 μm to 10 μm. If the thickness of the porous substrate is less than 1 μm, it may be difficult to maintain mechanical properties of the separator, and if the thickness of the porous substrate exceeds 100 am, the internal resistance of the lithium battery may increase. The porosity of the porous substrate included in the separator may be 5% to 95%. If the porosity is less than 5%, the internal resistance of the lithium battery may increase, and if the porosity is greater than 95%, it may be difficult to maintain mechanical properties of the porous substrate. The pore size of the porous substrate in the separator may be 0.01 m to 50 μm, 0.01 μm to 20 μm, or 0.01 μm to 10 μm. If the pore size of the porous substrate is less than 0.01 μm, the internal resistance of the lithium battery may increase, and if the pore size of the porous substrate exceeds 50 μm, it may be difficult to maintain mechanical properties of the porous substrate.

As the method for manufacturing the separator, any suitable method that can be used in the art may be used. For example, the separator may be manufactured by preparing a slurry containing organic particles, a first binder, and optionally inorganic particles, applying the same on the porous substrate, drying, and rolling.

The method for coating the slurry is not particularly limited, and any method that can be used in the art may be used. For example, the slurry may be applied by a method such as printing, compression, press-fitting, roller coating, blade coating, bristling coating, dipping coating, spray coating, or streamline coating.

A lithium battery according to another embodiment includes a cathode, an anode, and a separator disposed between the cathode and the anode. According to one embodiment, a lithium battery includes an electrode assembly including a cathode, an anode, and a separator disposed between the cathode and the anode, and the electrode assembly may have a jelly roll shape. Since the lithium battery includes the separator, adhesion between electrodes (the cathode and the anode) and the separator increases, and thus, a volume change during charging and discharging of the lithium battery can be suppressed. Accordingly, degradation of the lithium battery accompanied by the volume change of the lithium battery may be suppressed, and thus lifetime characteristics of the lithium battery may be improved.

The lithium battery may be manufactured, for example, in the following manner.

First, an anode active material composition in which an anode active material, a conductive material, a binder, and a solvent are mixed is prepared. The anode active material composition is directly coated on a metal current collector to manufacture an anode plate. Alternatively, the anode active material composition may be cast on a separate support, and then a film separated from the support may be laminated on a metal current collector to manufacture an anode plate. The anode is not limited to the forms listed above and may be in a form other than the form stated above.

The anode active material includes a carbon-based material.

The carbon-based material may be crystalline carbon, amorphous carbon, or a mixture thereof. The crystalline carbon may be non-shaped, plate-like, flake-like natural graphite or artificial graphite, graphene, carbon black, fullerene soot, or a combination thereof.

Natural graphite is naturally occurring graphite, and includes flake graphite, high crystalline graphite, microcrystalline or cryptocrystalline (amorphous) graphite, and the like. Artificial graphite is artificially synthesized graphite, which is made by heating amorphous carbon to a high temperature, and includes primary or electrographite, secondary graphite, graphite fiber, and the like. Expandable graphite is obtained by the intercalation of a chemical, such as acid or alkali, between layers of graphite, and heating the chemical to inflate the vertical layer of the graphite molecular structure. Graphene includes a single layer of graphite or a plurality of single layers of graphite. Carbon black is a crystalline material having less structural regularity than graphite and may be converted to graphite by heating at about 3,000° C. for a prolonged period of time. Fullerene soot is a carbon mixture containing at least 3 wt % fullerene, which is a polyhedral bundle-shaped compound consisting of about 60 or more carbon atoms. The crystalline carbon may have a spherical, plate-like, fibrous, tubular or powder form.

The amorphous carbon may be soft carbon (low temperature calcined carbon), hard carbon, mesophase pitch carbide, calcined coke, polymer carbide, or a combination thereof.

The anode active material may further include a non-carbon-based material. For example, the anode active material may include at least one selected from the group consisting of a metal capable of forming an alloy with lithium, an alloy of a metal capable of forming an alloy with lithium, and an oxide of a metal capable of forming an alloy with lithium.

For example, the lithium-alloyable metal may be Si, Sn, Al, Ge, Pb, Bi, Sb a Si—Y alloy (where Y is an alkali metal, an alkaline earth metal, Group 13-16 elements, a transition metal, a rare-earth element, or a combination thereof, and is not Si), or a Sn—Y alloy (where Y is an alkali metal, an alkaline earth metal, Group 13-16 elements, a transition metal, a rare-earth element, or a combination thereof, and is not Sn). The element Y may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may be lithium titanium oxide, vanadium oxide, or lithium vanadium oxide.

For example, the non-transition metal oxide may be $SnO_2$ or $SiO_x$ ($0<x<2$).

Specifically, the anode active material may be one or more selected from the group consisting of Si, Sn, Pb, Ge, Al, SiOx ($0<x\leq 2$), SnOy($0<y\leq 2$), $Li_4Ti_5O_2$, $TiO_2$, $LiTiO_3$, and $Li_2Ti_3O_7$, but are not limited thereto. Any material that is used as the non-carbon-based material in the art may be used.

According to one embodiment, the anode active material may be a mixture of the carbon-based material and the non-carbon-based material or a composite containing the carbon-based material and the non-carbon-based material.

As the conductive material, acetylene black, ketjen black, natural graphite, artificial graphite, carbon black, acetylene black, ketjen black, carbon fiber, metal powder such as copper, nickel, aluminum, silver, metal fiber, etc. may be used. In addition, conductive materials such as polyphenylene derivatives may be used alone or in combination of one or more, but are not limited thereto, and any conductive material that can be used in the art may be used. In addition, the above-described crystalline carbon-based material may be added as a conductive material.

As the binder, a vinylidene fluoride/hexafluoropropylene copolymer, polyvinylidene fluoride (PVDF), polyacrylonitrile, polymethyl methacrylate, polytetrafluoroethylene and mixtures thereof, or a styrene butadiene rubber-based polymer, may be used, but is not limited thereto. Any material that can be used as a binder in the art may be used.

As the solvent, N-methylpyrrolidone, acetone, or water may be used, but it is not limited thereto. Any solvent that can be used in the art may be used.

The contents of the anode active material, the conductive material, the binder, and the solvent are at levels commonly used in lithium batteries. At least one of the conductive material, the binder, and the solvent may be omitted depending on the use and configuration of the lithium battery.

Meanwhile, the binder used in the manufacture of the anode may be the same as the coating composition included in the adhesive layer of the separator.

Next, a cathode active material composition in which a cathode active material, a conductive material, a binder, and a solvent are mixed is prepared. The cathode active material composition is directly coated on a metal current collector and then dried to manufacture a cathode plate. Alternatively, the cathode active material composition may be cast on a separate support, and then a film separated from the support may be laminated on a metal current collector to manufacture a cathode plate.

The cathode active material may include at least one selected from the group consisting of lithium cobalt oxide, lithium nickel cobalt manganese oxide, lithium nickel cobalt aluminum oxide, lithium iron phosphate, and lithium manganese oxide, but is not necessarily limited thereto. Any cathode active material that can be used in the art may be used.

For example, the cathode active material may be a compound represented by one of $Li_aA_{1-b}B_bD_2$ (where $0.90\leq a\leq 1.8$, and $0\leq b\leq 0.5$); $Li_aE_{1-b}B_bO_{2-c}D_c$ (where $0.90\leq a\leq 1.8$, $0\leq b\leq 0.5$, $0\leq c\leq 0.05$); $LiE_{2-b}B_bO_{4-c}D_c$ (where $0\leq b\leq 0.5$, and $0\leq c\leq 0.05$); $Li_aNi_{1-b-c}Co_bB_cD_\alpha$ (where $0.90\leq a\leq 1.8$, $0\leq b\leq 0.5$, $0\leq c\leq 0.05$, and $0<\alpha\leq 2$); $Li_aNi_{1-b-c}CO_bB_cO_{2-\alpha}F_\alpha$ (where $0.90\leq a\leq 1.8$, $0\leq b\leq 0.5$, $0\leq c\leq 0.05$, and $0<\alpha\leq 2$); $Li_aNi_{1-b-c}Co_bB_cO_{2-\alpha}F_2$ (where $0.90\leq a\leq 1.8$, $0\leq b\leq 0.5$, $0\leq c\leq 0.05$, and $0<\alpha\leq 2$); $Li_aNi_{1-b-c}Mn_bB_cD_\alpha$ (where $0.90\leq a\leq 1.8$, $0\leq b\leq 0.5$, $0\leq c\leq 0.05$, and $0<\alpha\leq 2$); $Li_aNi_{1-b-c}Mn_bB_cO_{2-\alpha}F_\alpha$ (where $0.90\leq a\leq 1.8$, $0\leq b\leq 0.5$, $0\leq c\leq 0.05$, and $0<\alpha\leq 2$); $Li_aNi_{1-b-c}Mn_bB_cO_{2-\alpha}F_2$ (where $0.90\leq a\leq 1.8$, $0\leq b\leq 0.5$, $0\leq c\leq 0.05$, and $0<\alpha\leq 2$); $Li_aNi_bE_cG_dO_2$ (where $0.90\leq a\leq 1.8$, $0\leq b\leq 0.9$, $0\leq c\leq 0.5$, and $0.001\leq d\leq 0.1$); $Li_aNi_bCo_cMn_dGeO_2$ (where $0.90\leq a\leq 1.8$, $0\leq b\leq 0.9$, $0\leq c\leq 0.5$, $0\leq d\leq 0.5$, and $0.001\leq e\leq 0.1$.); $Li_aNiG_bO_2$ (where $0.90\leq a\leq 1.8$ and $0.001\leq b\leq 0.1$.); $Li_aCoG_bO_2$ (where $0.90\leq a\leq 1.8$ and $0.001\leq b\leq 0.1$.); $Li_aMnG_bO_2$ (where $0.90\leq a\leq 1.8$ and $0.001\leq b\leq 0.1$.); $Li_aMn_2G_bO_4$ (where $0.90\leq a\leq 1.8$ and $0.001\leq b\leq 0.1$.); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0\leq f\leq 2$); $Li_{(3-f)}Fe_2(PO_4)_3$ ($0\leq f\leq 2$); and $LiFePO_4$.

In the chemical formulae, A is Ni, Co, Mn, or a combination thereof; B is Al, Ni, Co, Mn, Cr, Fe, Mg, Sr, V, a rare-earth element, or a combination thereof; D is O, F, S, P, or a combination thereof, E is Co, Mn, or a combination thereof, F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof, and J is V, Cr, Mn, Co, Ni, Cu, or a combination thereof.

Of course, one having a coating layer on the surface of the compound may be used, or a compound having a coating layer may be used in combination with the compound. The coating layer may include a coating element compound, such as an oxide of a coating element, a hydroxide of a coating element, an oxyhydroxide of a coating element, an oxycarbonate of a coating element, or a hydroxycarbonate of a coating element Compounds constituting these coating layers may be amorphous or crystalline. As a coating element included in the coating layer, Mg, Al, Co, K, Na, Ca, Si, Ti, V, Sn, Ge, Ga, B, As, Zr, or a mixture thereof may be used. As a coating layer forming process, any coating process may be used as long as the compound can be coated by a process (e.g., spray coating, dipping, etc.) that does not adversely affect the physical properties of the cathode active material by using these elements, a detailed description thereof will be omitted because this can be well understood by a person skilled in the art.

For example, $LiNiO_2$, $LiCoO_2$, $LiMn_xO_{2x}$(x=1, or 2), $LiNi_{1-x}Mn_xO_2$ (0<x<1), $LiNi_{1-x-y}Co_xMn_yO_2$ (0≤x≤0.5 and 0≤y≤0.5), $LiFeO_2$, $V_2O_5$, TiS, or MoS may be used.

In the cathode active material composition, the conductive material, the binder, and the solvent may be the same as those used in the anode active material composition. Meanwhile, by further adding a plasticizer to the cathode active material composition and/or the anode active material composition, pores can also be formed in the electrode plate.

The contents of the cathode active material, conductive material, general binder, and solvent are at levels commonly used in lithium batteries. Depending on the use and configuration of the lithium battery, one or more of the conductive material, general binder, and solvent may be omitted.

Meanwhile, the binder used in manufacturing the cathode may be the same as the adhesive layer composition included in the adhesive layer of the separator.

Next, the separator is disposed between the cathode and the anode.

In an electrode assembly including a cathode/separator/anode, as described above, the separator disposed between the cathode and the anode includes: a porous substrate; and an adhesive layer disposed on both sides of the porous substrate, wherein the adhesive layer includes the coating composition for a separator.

The separator may be separately prepared and disposed between the cathode and the anode. Alternatively, the separator may be prepared by: winding an electrode assembly including a cathode/separator/anode into a jelly roll form and then accommodating the jelly roll in a battery case or pouch; in a state of being accommodated in the battery case or pouch, pre-charging the jelly roll while thermally softening the jelly roll under pressure; hot-rolling the charged jelly roll; cold-rolling the charged jelly roll; and performing a formation step in which the charged jelly roll is charged/discharged under pressure.

Next, the electrolyte is prepared.

The electrolyte may be in a liquid or gel state.

For example, the electrolyte may be an organic electrolyte. In addition, the electrolyte may be solid. For example, the electrolyte may be boron oxide, lithium oxynitride, etc., but is not limited thereto, and any solid electrolyte that can be used in the art may be used. The solid electrolyte may be formed on the anode by a process such as sputtering.

For example, an organic electrolyte may be prepared. The organic electrolyte may be prepared by dissolving a lithium salt in an organic solvent.

Any organic solvent that can be used as an organic solvent in the art may be used. For example, the organic solvent may be propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, methyl propionate, ethyl propionate, propyl propionate, benzonitrile, acetonitrile, tetrahydrofuran, 2-methyltetrahydrofuran, γ-butyrolactone, dioxolane, 4-methyldioxolane, N, N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, or a mixture thereof.

As the lithium salt, any lithium salt that can be used in the art may be used. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (where x, y is a natural number), LiCl, LiI, or mixtures thereof.

Figure 2:
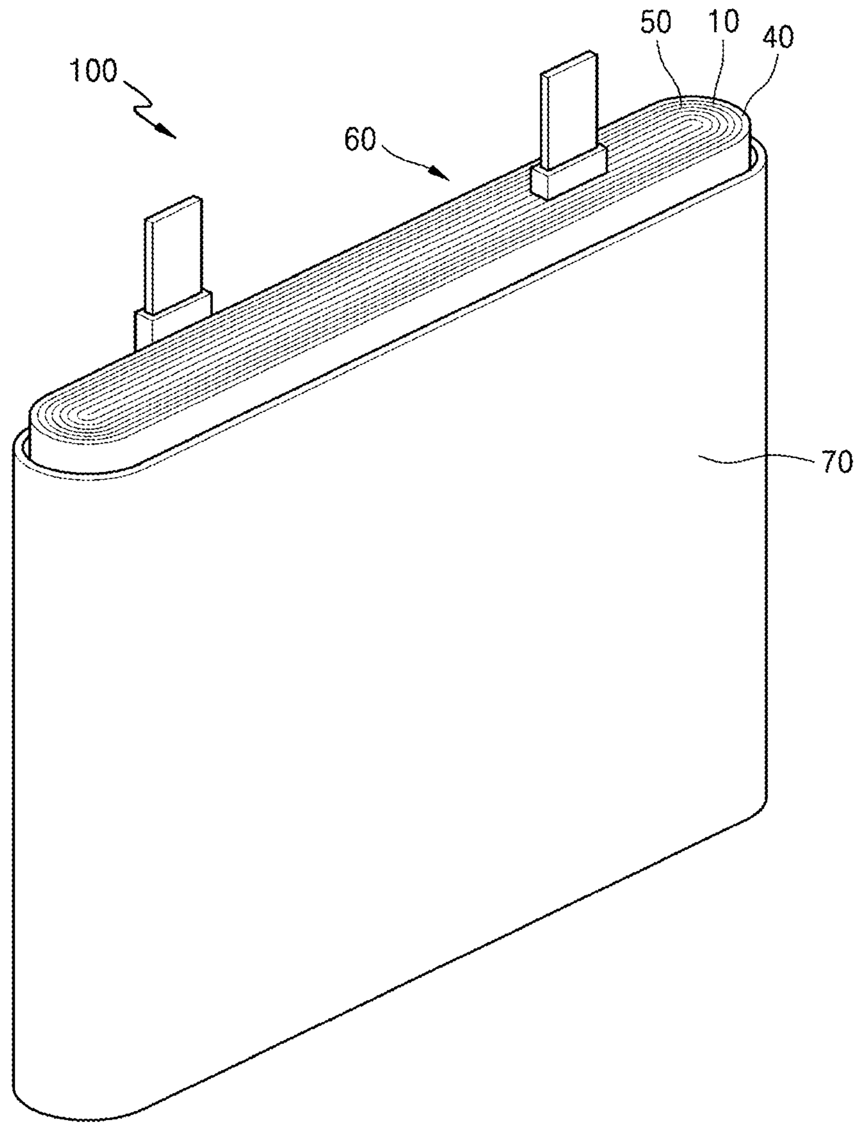
FIG. 2 is a schematic diagram of a lithium battery according to an example embodiment.

As an example of a lithium battery, a prismatic lithium secondary battery will be described by way of example. FIG. 2 is an exploded perspective view of a lithium battery according to an embodiment.

Referring to FIG. 2, the lithium secondary battery 100 according to an embodiment includes an electrode assembly 60 wound with a separator 10 interposed between a cathode 40 and an anode 50, and a case 70 having the electrode assembly 60 embedded therein.

The electrode assembly 60 may be in the shape of, for example, a jelly roll formed by winding the cathode 40 and the anode 50 with the separator 10 therebetween.

The cathode 40, the anode 50, and the separator 10 are impregnated with an electrolyte (not shown).

The lithium battery may be a lithium ion battery. The lithium battery may be a lithium polymer battery.

The lithium battery has an excellent high-rate characteristic and lifetime characteristic, and thus is suitable for an electric vehicle (EV). For example, the lithium battery is suitable for a hybrid vehicle such as a plug-in hybrid electric vehicle (PHEV).

The present inventive concept is explained in more detail through the following examples and comparative examples. However, the following examples are merely illustrative for the present inventive concept, and the scope of the present inventive concept is not limited thereto.

(Manufacture of Lithium Battery)

Example 1

(Manufacture of Separator)

6 parts by weight of ceramic particles $Al_2O_3$(ASES-11, Sumitomo Co.), 4 parts by weight of a binder and a composition for forming an adhesive layer was prepared by mixing 90 parts by weight of acetone as a solvent. The binder was prepared by mixing a first binder having a weight average molecular weight of 1,120,000, prepared by suspension polymerization of 93.5 wt % of vinylidene fluoride, 5 wt % of hexafluoropropylene, and 1.5 wt % of acrylic acid, and a second binder having a weight average molecular weight of 450,000, prepared by emulsion polymerization of and 95 wt % of vinylidene fluoride and 5 wt % of hexafluoropropylene in a weight ratio of 5:5 in an acetone solvent.

The separator was manufactured by forming an adhesive layer having a thickness of 3.0 m on one side of a polyethylene substrate that is a porous substrate by gravure-printing a composition for forming the adhesive layer on a polyethylene porous substrate (SK Innovation, PE) having a thickness of 7.5 μm.

(Manufacture of Anode)

An anode was prepared according to the following procedure.

After mixing 97 wt % of graphite particles having an average particle diameter of m, 1.5 wt % of styrene-butadiene rubber (SBR) binder, and 1.5 wt % of carboxymethylcellulose (CMC), the mixture was put into distilled water and stirred for 60 minutes by using a mechanical stirrer to prepare an anode active material slurry. The slurry was applied on a copper current collector having a thickness of 10 m by using a doctor blade, dried in a hot air dryer at 100° C. for 0.5 hours, dried again for 4 hours in a vacuum at 120° C., and then roll-pressed to manufacture the anode.

(Manufacture of Cathode)

Separately, a cathode was manufactured according to the following procedure.

97 wt % of $LiCoO_2$, 1.5 wt % of carbon black powder as a conductive material, and 5 wt % of polyvinylidene fluoride were mixed and put into N-methyl-2-pyrrolidone solvent, followed by stirring for 30 minutes by using a mechanical stirrer, to prepare a cathode active material slurry. The slurry was coated on a 20 μm thick aluminum current collector by using a doctor blade, dried for 0.5 hours in a hot air dryer at 100° C., dried again for 4 hours in a vacuum and 120° C., and roll-pressed to prepare a cathode plate.

(Electrode Assembly Jelly Roll)

An electrode assembly jelly roll was prepared by interposing the separator between the cathode plate and the anode prepared above, and then winding. After inserting the jelly roll into a pouch and injecting an electrolyte, the pouch was vacuum-sealed.

As the electrolyte, 1.3 M $LiPF_6$ was dissolved in a 3/5/2 (volume ratio) mixed solvent of ethylene carbonate (EC)/ethylmethyl carbonate (EMC)/diethyl carbonate (DEC).

A lithium battery was manufactured by pressing at a temperature of 80° C. for 3 minutes while applying a pressure of 11.7 kgf/cm$^2$ to the jelly roll inserted into the pouch.

Example 2

A separator and a lithium battery were prepared in the same manner as in Example 1, except that when preparing the composition for forming an adhesive layer, the content of ceramic particles was changed to 4 parts by weight, and the content of a binder was changed to 6 parts by weight.

Example 3

A separator and a lithium battery were prepared in the same manner as in Example 1, except that when preparing the composition for forming an adhesive layer, the weight ratio of a first binder and a second binder was changed to 7:3.

Comparative Example 1

A separator and a lithium battery were prepared in the same manner as in Example 1, except that when preparing the composition for forming an adhesive layer, the weight ratio of a first binder and a second binder was changed to 10:0.

Comparative Example 2

A separator and a lithium battery were prepared in the same manner as in Example 1, except that when preparing the composition for forming an adhesive layer, the content of ceramic particles was changed to 2 parts by weight, the content of a binder was changed to 8 parts by weight, and the weight ratio of a first binder and a second binder was changed to 10:0.

Comparative Example 3

A separator and a lithium battery were prepared in the same manner as in Example 1, except that when preparing the composition for forming an adhesive layer, the content of ceramic particles was changed to 7.5 parts by weight, the content of a binder was changed to 2.5 parts by weight, and the weight ratio of a first binder and a second binder was changed to 10:0.

Comparative Example 4

A separator and a lithium battery were prepared in the same manner as in Example 1, except that when preparing the composition for forming an adhesive layer, the content of ceramic particles was changed to 7 parts by weight, the content of a binder was changed to 3 parts by weight, and the weight ratio of a first binder and a second binder was changed to 0:10.

The lithium battery showed poor charge/discharge characteristics.

Evaluation Example 1: Adhesion Evaluation

In the lithium batteries prepared in Examples 1 to 3 and Comparative Examples 1 and 5, wet adhesion and dry adhesion were measured, respectively, and the adhesion ratios were calculated by using these values, and are shown in Table 1 below. The adhesion ratio can be represented by equation 1 below.

(1) Wet Adhesion

Wet adhesion represents electrode adhesion (bending strength) of the separator, measured by using a 3-point bending method, in a lithium battery obtained by impregnating a battery assembly including a cathode, an anode, and a separator with an electrolyte, and then pressing under conditions of 10 to 20 kgf/cm$^2$, 70 to 90° C. in temperature, and 1 to 5 minutes in time.

A battery assembly being in a jelly roll state was prepared by interposing the separator prepared in Example 1 between the cathode and the anode prepared in Example 1, and then winding. After inserting the jelly roll into a pouch and injecting an electrolyte, the pouch was vacuum-sealed.

As the electrolyte, 1.3 M $LiPF_6$ dissolved in a 3/5/2 (volume ratio) mixed solvent of ethylene carbonate (EC)/ethylmethyl carbonate (EMC)/diethyl carbonate (DEC), was used. A press was applied to the battery assembly being in the state of a jelly roll inserted into the pouch at 80° C., 11.7 kgf/cm$^2$, for 180 seconds.

(2) Dry Adhesion

Dry adhesion represents electrode adhesion (bending strength) of the separator, measured by using a 3-point bending method, in a lithium battery obtained by pressing a battery assembly including a cathode, an anode, and a separator under conditions of 10 to 20 kgf/cm$^2$, 70 to 90° C. in temperature, and 5 to 20 seconds in time.

A battery assembly being in a jelly roll state was prepared by interposing the separator prepared in Example 1 between the cathode and the anode prepared in Example 1, and then winding. After inserting the jelly roll into a pouch and injecting an electrolyte, the pouch was vacuum-sealed.

The battery assembly inserted into the pouch was pressed at 85° C., 11.7 kgf/cm$^2$, for 10 seconds, and the electrode adhesion (bending strength) of the separator was evaluated by using a 3-point bending method.

As the electrode adhesion (bending strength) of the separator, the adhesion between an active material layer of the cathode and the separator was measured by using a 3-point bending (INSTRON) method. A pouch cell that had undergone 0.1 C charge/discharge was pressed at a speed of 5 mm/min by using a jig, and the MAX value (N, MPa) was measured from zero-point to 5 mm bending. The evaluation conditions of the 3-point bending (INSTRON) method are as follows.

Lower Span Width: 27 mm, Lower Span Diameter: 5 mm
Upper Jig Diameter: 5 mm, Load Cell: 1000N $$\text{Adhesion ratio} = \{(\text{dry adhesion} - 10)/(\text{wet adhesion} - 350)\} \quad \text{<Equation 1>}$$

TABLE 1

| Classification | Content of ceramic particles (parts by weight) | Content of binder (parts by weight) | Wet adhesion Bending strength (N) | Dry adhesion Bending strength (N) | Adhesion ratio |
|---|---|---|---|---|---|
| Example 1 | 6 | 4 | 380 | 38 | 0.933 |
| Example 2 | 4 | 6 | 450 | 44 | 0.340 |
| Example 3 | 6 | 4 | 450 | 15 | 0.050 |
| Comparative Example 1 | 6 | 4 | 420 | 13 | 0.043 |
| Comparative Example 2 | 2 | 8 | 700 | 11 | 0.003 |
| Comparative Example 3 | 7.5 | 2.5 | 400 | 8 | −0.040 |
| Comparative Example 4 | 7 | 3 | 270 | 32 | −0.275 |

Referring to Table 1, it was found that the lithium batteries of Examples 1 to 3 had excellent wet adhesion and dry adhesion, suggesting that the adhesion ratio of the separator was very superior to that of the separators of Comparative Examples 1 to 4.

Evaluation Example 2: Lifetime Characteristics

In the lithium batteries manufactured according to Examples 1 to 3 and Comparative Examples 1 to 4, charge and discharge characteristics, etc. were evaluated with a charger and discharger (manufacturer: TOYO, model: TOYO-3100).

For lifetime evaluation, constant voltage charging was performed until a current of 0.05 C was reached after constant current charging until reaching 4.4 V at a current of 1 C. After a rest period of about 10 minutes, the fully charged cell was evaluated by repeating a constant current discharge cycle 500 times until the voltage reached 3 V at a current of 1 C.

The lifetime evaluation results are shown in Table 2 below. In the life characteristics of Table 2 below, OK represents capacity >80% and NG represents capacity <80%.

Evaluation Example 3: Heat Exposure

For evaluation of heat exposure characteristics of the separators prepared according to Examples 1 to 3 and Comparative Examples 1 to 4, heat exposure evaluation was performed 24 hours after charging was performed under 0.05 C cutoff conditions from 3.0 V discharge state to 4.4 V at 0.5 C charge rate.

The temperature of evaluation chamber was raised from room temperature to 137° C. at 5° C./minute, and when the temperature reached 137° C., this state was maintained for 1 hour, the oven temperature was returned to room temperature, and the test was finished. At this time, battery states were evaluated. In Table 2 below, 0F/10 indicates 0 fail out of 10 evaluations, which is denoted by "OK", and 1F/10 indicates 1 fail out of 10 evaluations, which is denoted by "NG".

TABLE 2

| Classification | Content of ceramic particles (parts by weight) | Content of binder (parts by weight) | Assembly processability | Lifetime characteristics (%) (>85%@500 cy) | Heat exposure (137° C.) |
|---|---|---|---|---|---|
| Example 1 | 6 | 4 | OK | 91 | OK (0F/10) |
| Example 2 | 4 | 6 | OK | 89 | OK (0F/10) |
| Example 3 | 6 | 4 | OK | 92 | OK (0F/10) |
| Comparative Example 1 | 6 | 4 | OK | 90 | NG (1F/10) |
| Comparative Example 2 | 2 | 8 | NG | NG | OK (0F/10) |
| Comparative Example 3 | 7.5 | 2.5 | NG | 90 | NG (2F/10) |
| Comparative Example 4 | 7 | 3 | OK | 28@200 cycle | NG(7F/10) |

Referring to Table 2, it was found that the lifetime characteristics of the lithium batteries of Examples 1 to 3 were significantly improved compared to the lithium batteries of Comparative Examples 2 and 4. The lithium battery of Comparative Example 2 had excellent heat exposure characteristics, but the adhesion ratio was less than 0.05, as shown in Table 1, resulting in poor cell assembly processability and lifetime characteristic. The separator of Comparative Example 1 had excellent assembly processability and poor heat exposure characteristics, as shown in Table 2, and the separator of Comparative Example 3 had poor assembly processability and heat exposure characteristics. In addition, it was found that when the separator of Comparative Example 4 was used, the lifetime characteristic was greatly reduced and the heat exposure characteristic was deteriorated.

While one embodiment has been described with reference to drawings and embodiments, it is to be understood that the invention is not limited to the disclosed embodiments, but, on the contrary, is intended to cover various modifications and equivalent arrangements included within the spirit and scope of the appended claims. Therefore, the scope of protection of the present invention should be defined by the appended claims.

The invention claimed is:

1. A lithium battery, comprising:

a cathode;

an anode; and a separator interposed between the cathode and the anode, the separator including a porous substrate and an adhesive layer, wherein:

the adhesive layer of the separator includes ceramic particles and a binder at a mixing weight ratio of 4:6 to 6:4, the binder includes a first binder that includes a first polyvinylidene fluoride-based compound and a second binder that includes a second polyvinylidene fluoride-based compound, an adhesion ratio of the lithium battery, represented by Equation 1 below, is 0.05 to 1.0, $$\text{adhesion ratio} = \{(\text{dry adhesion} - 10)/(\text{wet adhesion} - 350)\}, \quad \text{<Equation 1>}$$

and the first polyvinylidene fluoride-based compound and the second polyvinylidene fluoride-based compound each:

have a glass transition temperature (Tg) value of 50° C. or higher, and include polyvinylidene fluoride, vinylidene fluoride-hexafluoropropylene copolymer, vinylidene fluoride-trichlorethylene copolymer, vinylidene fluoride-chlorotrifluoroethylene copolymer, vinylidene fluoride-hexafluoropropylene-acrylic acid copolymer, or a combination thereof.

2. The lithium battery of claim 1, wherein the adhesion ratio is 0.10 to 0.95.

3. The lithium battery of claim 1, wherein the ceramic particles include alumina ($Al_2O_3$), boehmite, $BaSO_4$, MgO, $Mg(OH)_2$, clay, silica ($SiO_2$), $TiO_2$, ZnO, CaO, $SiO_2$, $TiO_2$, $SnO_2$, $CeO_2$, NiO, GaO, $ZrO_2$, $Y_2O_3$, $SrTiO_3$, or $BaTiO_3$.

4. The lithium battery of claim 1, wherein a content of the ceramic particles in the adhesive layer is 40 to 60 parts by weight based on 100 parts by weight of the adhesive layer.

5. The lithium battery of claim 1, wherein a content of the binder in the adhesive layer is 40 to 60 parts by weight based on 100 parts by weight of the adhesive layer.

6. The lithium battery of claim 1, wherein:

the first polyvinylidene fluoride-based compound of the first binder includes a copolymer including vinylidene fluoride repeating units and hexafluoropropylene repeating units, a content of the hexafluoropropylene repeating units is 10 wt % or less, and a weight average molecular weight of the first binder is 800,000 to 1,500,000, and the second polyvinylidene fluoride-based compound of the second binder includes a copolymer including vinylidene fluoride repeating units and hexafluoropropylene repeating units, a content of the hexafluoropropylene repeating units is 10 wt % or less, and a weight average molecular weight of the second binder is 600,000 or less.

7. The lithium battery of claim 1, wherein the wet adhesion is 350 N or more, and the dry adhesion is 10 N or more.

8. A method for manufacturing the lithium battery according to claim 1, the method comprising:

preparing a laminate by laminating a cathode, a porous substrate, a separator disposed on one surface of the porous substrate, and an anode; and pressing the laminate under conditions of 10 to 20 kgf/$cm^2$, 70 to 90° C., and 1 to 5 minutes.

* * * * *